US012637992B2

(12) United States Patent
Czechanowski et al.

(10) Patent No.: US 12,637,992 B2
(45) Date of Patent: May 26, 2026

(54) TURBINE UNIT FOR A SUPERCHARGING DEVICE

(71) Applicant: BorgWarner Inc., Auburn Hills, MI (US)

(72) Inventors: Martin Czechanowski, Schwetzingen (DE); Christian Kraemer, Guntersblum (DE)

(73) Assignee: BorgWarner, Inc., Auburn Hills, MI (US)

(*) Notice: Subject to any disclaimer, the term of this patent is extended or adjusted under 35 U.S.C. 154(b) by 0 days.

(21) Appl. No.: 18/650,610

(22) Filed: Apr. 30, 2024

(65) Prior Publication Data

US 2025/0283442 A1 Sep. 11, 2025

(30) Foreign Application Priority Data

Mar. 8, 2024 (DE) ..................... 10 2024 106 746.2

(51) Int. Cl.
*F01D 25/24* (2006.01)
*F01D 25/16* (2006.01)
(Continued)

(52) U.S. Cl.
CPC ........... *F02M 26/41* (2016.02); *F01D 25/162* (2013.01); *F01D 25/243* (2013.01); *F04D 17/10* (2013.01); *F04D 29/4206* (2013.01)

(58) Field of Classification Search
CPC ........ F01D 25/16; F01D 25/162; F01D 25/24; F01D 25/243; F02B 39/00
See application file for complete search history.

(56) References Cited

U.S. PATENT DOCUMENTS 6,739,845 B2 * 5/2004 Woollenweber ......... H02K 9/06 60/608
2010/0296925 A1 * 11/2010 Sakai .................... F01D 25/243 415/214.1
2019/0234237 A1 * 8/2019 Kitamura ................ F01D 25/24

FOREIGN PATENT DOCUMENTS

CN 115467740 A * 12/2022 ........... F01N 13/087
DE 102011053954 A1 3/2013
(Continued)

OTHER PUBLICATIONS

JP2014001639 by PE2E Aug. 23, 2024.*
(Continued)

*Primary Examiner* — Deming Wan
(74) *Attorney, Agent, or Firm* — Patent Central LLC; Stephan A. Pendorf

(57) ABSTRACT

A turbine unit (10) for a supercharging device (1), with a bearing housing (30) and a turbine housing (20) which is coupled to the bearing housing (30) via a flange connection (100). The flange connection (100) has a turbine-housing-side flange (110) and a bearing-housing-side flange (120). The turbine-housing-side flange (110) and the bearing-housing-side flange (120) are configured and coupled to each other in such a way that they form an axial distance region (130) and an axial contact region (140) of the flange connection (100). The axial contact region (140) is arranged radially on the inside of the axial distance region (130). A radial distance ($R_D$) between an outer radius of the axial contact region ($R_{KA}$) and a circumferential radius ($R_F$) of the bearing-housing-side flange (120) is at least 3.50 mm.

17 Claims, 6 Drawing Sheets

(51) Int. Cl.

| | |
|---|---|
| ***F02B 39/00*** | (2006.01) |
| ***F02M 26/41*** | (2016.01) |
| ***F04D 17/10*** | (2006.01) |
| ***F04D 29/42*** | (2006.01) |

(56) References Cited

FOREIGN PATENT DOCUMENTS

| | | | | | |
|---|---|---|---|---|---|
| JP | H08158876 A | | 6/1996 | | |
| JP | 2014001639 A | * | 1/2014 | ............ | F01D 11/005 |
| JP | 2020118061 A | * | 8/2020 | .............. | F02B 39/00 |
| RU | 486137 A1 | | 6/1996 | | |
| WO | WO-2020095716 A1 | * | 5/2020 | ............. | F01D 25/24 |

OTHER PUBLICATIONS

CN11567740 by PE2E Aug. 23, 2024.*
WO2020095716 by PE2E 5/823/25.*
JP2020118061 by PE2E Oct. 8, 2025.*
German Search Report issued on Oct. 29, 2024, in German Application No. DE 10 2024 106 746.2.

* cited by examiner

TURBINE UNIT FOR A SUPERCHARGING DEVICE

TECHNICAL FIELD

The present invention relates to a turbine unit for a supercharging device, a supercharging device for an internal combustion engine or a fuel cell with such a turbine unit, and an engine system with such a supercharging device.

BACKGROUND

Ever-increasing numbers of vehicles of the newer generation are being equipped with supercharging devices in order to achieve the required aims and satisfy legal regulations. In the development of supercharging devices, it is the aim to optimize the individual components and the system as a whole with regard to their reliability and efficiency.

Known supercharging devices normally have at least one compressor with a compressor wheel which is connected to a drive unit via a common shaft. The compressor compresses the fresh air that is drawn in for the internal combustion engine or for the fuel cell. In this way, the air or oxygen quantity that is available to the engine for combustion or to the fuel cell for reaction is increased. This in turn leads to an increase in performance of the internal combustion engine or of the fuel cell. Supercharging devices may be equipped with different drive units. In particular electric chargers, in which the compressor is driven by an electric motor, and turbochargers, in which the compressor is driven by a turbine, in particular a radial turbine, are known in the prior art. By contrast to an axial turbine (as provided for example in aircraft engines), in which there is a substantially exclusively axial incident flow, it is the case in a radial turbine that the exhaust-gas flow is conducted substantially radially, and in the case of a mixed-flow radial turbine semi-radially, that is to say with at least a small axial component, from a spiral-shaped turbine inlet onto the turbine wheel. Aside from the electric charger and the turbocharger, combinations of both systems are described in the prior art, these also being referred to as E-turbos. For example, an E-turbo may be an electrically assisted exhaust turbocharger or an electrically assisted supercharging unit or supercharging device for fuel cells.

In order to increase the efficiency of turbines and adapt them to different operating points, modem supercharging devices are equipped with a power setting device, which can be used to adjust or change the power generation of the supercharging device. Known power setting devices are, for example, a variable turbine geometry (VTG) or a wastegate flap (WG). A variable turbine geometry is an adjustable guide device for changing an inflow to a turbine wheel of the turbine. By changing the inflow (e.g. the flow cross section and the incident-flow angle), in particular, the flow velocity of the exhaust gas flow supplied to the turbine wheel can be changed, which leads to a corresponding change in the power of the supercharging device. Such systems are also known as variable guide vanes, VTG, guide grates or VTG guide grates.

Turbine units, which have a bearing housing for bearing a shaft and a turbine housing, which is coupled to the bearing housing via a flange connection, are known from the prior art. However, in current developments toward the use of turbines with guide devices, especially with variable turbine geometries with adjustable guide vanes, problems arise in known flange connections in the high temperature range (often at temperatures above 850° C.) for gasoline internal combustion engines. In particular, mechanical and thermal overload may occur in the flange of the bearing housing after a certain number of temperature cycles during use (i.e. during operation and in various operating states). As a result, cracks may form in the region close to an outer diameter of the bearing housing flange during high temperature use, the cracks leading to a short service life of the bearing housing.

Although this can be counteracted to a certain extent by an optimized and adapted material of the bearing housing or of the bearing housing flange, this leads to higher costs.

It is the object of the present invention to provide a turbine unit with an improved flange connection between a turbine housing and a bearing housing, and in particular to reduce a thermal load and mechanical load on the flange of the bearing housing.

SUMMARY OF THE INVENTION

The present invention relates to a turbine unit for a supercharging device as claimed in claim 1, a supercharging device for an internal combustion engine or a fuel cell having such a turbine unit as claimed in claim 15, and an engine system with such a supercharging device as claimed in claim 16. The dependent claims describe advantageous refinements of the turbine unit.

According to a first aspect of the present invention, a turbine unit for a supercharging device comprises a bearing housing, and a turbine housing, which is coupled to the bearing housing via a flange connection. The flange connection comprises a turbine-housing-side flange and a bearing-housing-side flange. The turbine-housing-side flange and the bearing-housing-side flange are designed and coupled to each other in such a way that they form an axial distance region and an axial contact region of the flange connection. The axial contact region is arranged radially on the inside with respect to the axial distance region. A radial distance between an outer radius of the axial contact region and a circumferential radius of the bearing-housing-side flange is at least 3.50 mm.

As a result, the axial contact between the bearing housing and the turbine housing, in particular between the bearing-housing-side flange and the turbine-housing-side flange, can be shifted further radially inward from a region close to the outer diameter of the bearing-housing-side flange. As a result, heat transmission from the turbine housing to the bearing housing and a maximally occurring temperature is shifted onto a smaller radius where the sensitivity to crack formation in the bearing-housing-side flange is lower, and heat dissipation or cooling can be provided in an improved manner. In addition, shifting of the axial contact region by at least 3.5 mm radially inward can improve the transmission of force in the flange connection during a temperature cycle (in which different thermal expansions may be present), resulting in a lower mechanical load on the bearing-housing-side flange. This can save costs since, e.g., the bearing-housing-side flange and the bearing housing do not have to be provided from a higher quality material for high temperature use. The design according to the invention can significantly increase the service life of the bearing-housing-side flange. The above-described advantageous effects can be provided in particular when the turbine unit comprises a guide device in the form of a variable turbine geometry and is used together with a (gasoline) internal combustion engine. This is because, especially in this configuration, high exhaust gas temperatures (often above 850° C.) can occur in the turbine housing, as a result of which the flange connection, in particular the turbine-housing-side flange and the bearing-housing-side flange, has to be larger in size (e.g. in comparison to applications in which no guide device is provided, the turbine unit only has a wastegate, and/or no (gasoline) internal combustion engine is provided). The advantageous effects described above can also be provided for this application area by the optimized flange connection according to the invention.

In refinements, the turbine-housing-side flange and the bearing-housing-side flange can be in axial contact directly with each other in the axial contact region. In refinements, the turbine-housing-side flange and the bearing-housing-side flange can be continuously spaced apart from each other in the axial distance region, in particular in the axial direction and along the radial extent thereof. The axial distance region can extend in the radial direction between the outer radius of the axial contact region and the circumferential radius of the bearing-housing-side flange. The axial contact region can be arranged directly adjacent to the axial distance region in the radial direction.

In refinements, the axial contact region can extend in the radial direction between an inner radius of the axial contact region and the outer radius. The inner radius of the axial contact region can correspond to an inner radius of the turbine housing proximal to the bearing-housing-side flange or adjacent to the turbine-housing-side flange.

In refinements, the flange connection can comprise at least one connecting element which is coupled to the turbine-housing-side flange and the bearing-housing-side flange in such a way that it generates an axial clamping force between the turbine-housing-side flange and the bearing-housing-side flange in the axial contact region. More precisely, the connecting element can be arranged in the radial direction in such a way that it generates an axial force between the turbine-housing-side flange and the bearing-housing-side flange in the axial distance region. The axial force is transmitted directly as a clamping force in the axial contact region. A radial position of the axial force applied by the connecting element can lie radially outside the axial contact region. In refinements, the connecting element can be a V-belt clip or a screw connection.

In refinements, the axial contact region can have a first radial width. The axial distance region can have a second radial width. A ratio of the first radial width to the second radial width can lie in the range of 0.20 to 0.70. In refinements, the ratio can lie in the range of 0.20 to 0.45. In particular, the ratio can lie in the range of 0.24 to 0.30. On the basis of these ratios, a contact cross section between the bearing-housing-side flange and the turbine-housing-side flange, via which heat can be transmitted axially from the turbine housing to the bearing housing, can be reduced. In addition, this ratio makes it possible to improve force transmission of a clamping force, which is applied in the axial direction between the bearing-housing-side flange and the turbine-housing-side flange, in particular in the axial contact region (or is transmitted thereto). In particular, during a temperature cycle in which different thermal expansions may be present in the flange connection, force transmission in the flange connection can be provided more moderately or more constantly. Consequently, this ratio can reduce a temperature load and/or a mechanical load on the bearing-housing-side flange. This can reduce cracking and increase the service life.

The turbine-housing-side flange and the bearing-housing-side flange can be designed and coupled to each other in such a way that they form at least one shoulder, which provides a radial centering surface pairing. In refinements, the shoulder can be formed between an outer circumferential surface of the bearing-housing-side flange and a collar, which extends in the axial direction, of the turbine-housing-side flange, which at least partially circumferentially surrounds the bearing-housing-side flange. In refinements, the at least one shoulder can be arranged in the radial direction in the axial distance region. The shoulder can divide the axial distance region into a first axial distance region and at least one second axial distance region. The first axial distance region can be arranged in the radial direction between the shoulder and the axial contact region. The second axial distance region can be arranged in the radial direction between the shoulder and the circumferential radius of the bearing-housing-side flange.

In refinements, the turbine-housing-side flange can have an annular projection which extends in the axial direction toward the bearing-housing-side flange and forms an axial contact surface which is in contact with the bearing-housing-side flange. In particular, the axial contact region can be formed between the axial contact surface and the bearing-housing-side flange. The first axial distance region can be designed as at least one annular depression in the bearing-housing-side flange and/or in the turbine-housing-side flange.

In refinements, the flange connection can have at least one sealing element, which is clamped between the turbine-housing-side flange and the bearing-housing-side flange in the axial distance region. The sealing element can provide improved sealing between the turbine housing and the bearing housing. The bearing-housing-side flange and/or the turbine-housing-side flange can have at least one annular depression in which the at least one sealing element is arranged. In refinements, the sealing element can be clamped in the first axial distance region. Alternatively or additionally, the at least one sealing element can be clamped in the at least one second axial distance region.

The bearing-housing-side flange can be formed integrally with the bearing housing. The turbine-housing-side flange can be formed integrally with the turbine housing. The bearing-housing-side flange and the turbine-housing-side flange can be configured in each case annularly and extending in the radial direction.

The bearing housing can have at least one annular cooling channel, which is arranged radially on the inside of the bearing-housing-side flange and proximally to a side surface of the bearing housing facing the turbine housing. The cooling channel in the bearing housing can provide improved heat dissipation from the bearing-housing-side flange. Together with the shifting of the axial contact region radially inward, a thermal load on the bearing-housing-side flange can be reduced and thus cracking can be reduced.

The turbine unit can comprise a turbine wheel, which is arranged in a receiving space of the turbine housing between a turbine housing inlet and a turbine housing outlet. The turbine unit can comprise a shaft which is mounted rotatably in the bearing housing. The turbine wheel is connected to a first end of the shaft for rotation therewith. In addition, the turbine unit can comprise a guide device, which is arranged in the receiving space radially outside the turbine wheel and surrounds the turbine wheel circumferentially. The guide device can be arranged spaced apart in the radial direction with respect to the turbine housing. This can reduce heat transmission into the turbine-housing-side flange and into the bearing-housing-side flange.

According to a second aspect of the present invention, a supercharging device for an internal combustion engine or a fuel cell comprises a turbine unit according to the first aspect of the present invention. In addition, the supercharging device comprises a compressor with a compressor housing. The compressor housing is coupled to the bearing housing on a side of the bearing housing opposite the turbine housing. The supercharging device can have all of the advantageous technical effects described above. The turbine unit can have all of the above-described refinements.

In refinements, the turbine unit can comprise a turbine wheel, which is arranged in a receiving space of the turbine housing. The supercharging device, in particular the turbine unit, can comprise a shaft, which is mounted rotatably in the bearing housing. The compressor can comprise a compressor wheel. The turbine wheel and the compressor wheel can be coupled to the shaft at opposite ends of the shaft for rotation therewith.

According to a third aspect of the present invention, an engine system comprises a supercharging device according to the second aspect of the present invention. The engine system also comprises an internal combustion engine with a plurality of cylinders. The turbine unit is arranged downstream of the internal combustion engine and a turbine housing inlet of the turbine housing is fluidically connected to the plurality of cylinders. The engine system can have all of the advantageous technical effects described above. The supercharging device can have all of the above-described refinements.

In refinements, the turbine unit can comprise a guide device. The guide device can have a plurality of adjustable guide vanes. The turbine unit can comprise a turbine wheel, which is arranged in a receiving space of the turbine housing. The guide device can be arranged radially outside the turbine wheel in the turbine housing and surrounds the turbine wheel circumferentially. The above-described advantageous effects of the flange connection can also be provided in particular for the combination of the internal combustion engine with the turbine unit and the guide device in the form of the variable turbine geometry (i.e. with the plurality of adjustable guide vanes). In refinements, the compressor can be arranged upstream of the internal combustion engine. A compressor housing outlet of the compressor housing can be fluidically connected to the internal combustion engine.

DETAILED DESCRIPTION

Figure 1:
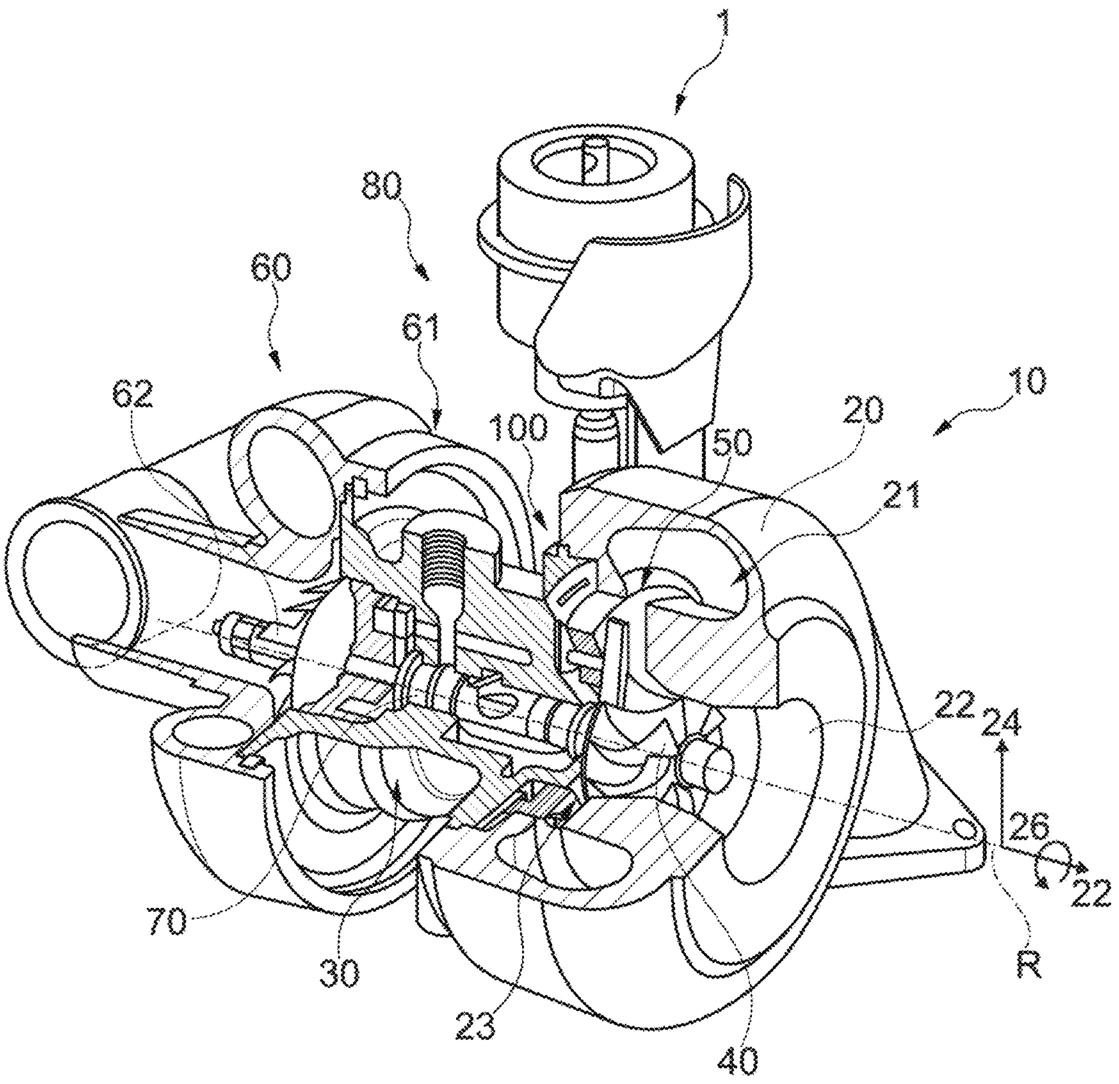
FIG. 1 shows an isometric view of an exemplary supercharging device with a turbine unit and a compressor.

In the context of this application, the expressions "axially" and "axial direction" refer to an axis of rotation R of the shaft 70 or the turbine wheel 40, the axis of rotation of the turbine unit 10, and the guide device 50. With reference to the figures (see FIGS. 1 to 5D), the axial direction is represented by reference sign 22. A radial direction 24 refers here to the axial direction 22. Likewise, a circumference or a circumferential direction 26 refers here to the axial direction 22. The directions 22 and 24 run orthogonally to each other.

FIG. 1 shows a supercharging device 1. The supercharging device 1 can be used for an internal combustion engine or a fuel cell and/or can be appropriately designed or dimensioned. In other words, the internal combustion engine can comprise the supercharging device 1. The internal combustion engine can be a gasoline internal combustion engine.

As shown in FIG. 1, the supercharging device 1 comprises a turbine unit 10 with a turbine and a bearing housing 30, and a compressor 60. The turbine unit 10 may comprise an actuating device 80. The supercharging device 1 may be a turbocharger here. In refinements, the supercharging device 1 can also be in the form of an E-turbo (not illustrated in the figs). The turbine unit 10, in particular the turbine, comprises a turbine housing 20, in which a turbine wheel 40 is arranged. The turbine may be in particular a radial turbine. The turbine housing 20 defines a turbine housing inlet 21 and a turbine housing outlet 22. The turbine housing inlet 21 may also be referred to as a turbine housing spiral. The turbine wheel 40 is arranged in a receiving space 23 of the turbine housing 20 between the turbine housing inlet 21 and the turbine housing outlet 22. The turbine also comprises a turbine housing rear wall, which is coupled to the turbine housing 20 on the bearing-housing side. As can be seen in FIGS. 2 to 5D, the turbine housing rear wall may be formed as a part of the bearing housing 30 (in particular by a side surface of the bearing housing 20 facing the turbine housing 20). With reference to FIG. 1, the supercharging device 1, in particular the turbine unit 10, further comprises a shaft 70 with an axis of rotation R, which is rotatably coupled to the turbine wheel 20. The shaft 70 is mounted rotatably in the bearing housing 30. The axial direction 22 is defined here with respect to the axis of rotation R. As shown in FIG. 1, the compressor 60 comprises a compressor housing 61, in which a compressor wheel 62 is arranged. The bearing housing 30 is coupled (or connected) to the turbine housing 20 via a flange connection 100, wherein the flange connection 100 is described in detail further below. The compressor housing 61 is coupled (or connected) to the bearing housing 30 on a side of the bearing housing 30 opposite the turbine housing 20. The compressor wheel 62 is coupled to the shaft 70 on an end of the shaft 70 opposite the turbine wheel 40 for rotation with said shaft. As shown in FIG. 1, the turbine unit may comprise a guide device 50, which is arranged in the receiving space 23 radially outside the turbine wheel 40 and surrounds the turbine wheel 40 circumferentially.

In addition to the guide device, the turbine unit 10 may comprise a power setting device in the form of a wastegate flap, which is provided in order to be able to close and open a wastegate of the turbine as required (not shown in the Figures). The wastegate flap can be connected here to the actuating device 80 via a lever and/or a control rod.

In refinements, the supercharging device 1 can further comprise an electric motor (not shown in the Figures), which can be arranged in an engine compartment in the bearing housing 30. The turbine wheel 40 and/or the compressor wheel 62 can be coupled here to the electric motor via the shaft 70. The electric motor may have a rotor and a stator, it being possible in particular for the rotor to be coupled to the shaft 70 for rotation therewith, and the stator surrounding the rotor and being coupled to the bearing housing 30. Furthermore, a power electronics circuit for controlling the electric motor can be arranged in a receiving space in the bearing housing 30. The electric motor may also comprise a generator mode.

FIGS. 2 to 5D show sectional views of the turbine unit 10. As shown, the guide device 50 can be configured as a variable turbine geometry (VTG). The guide device 50 may comprise a carrier ring and a plurality of adjustable guide vanes, the adjustable guide vanes being mounted rotatably in the carrier ring. Alternatively or additionally, the guide device 50 may comprise a plurality of fixed guide vanes, the fixed guide vanes being arranged fixedly in a predetermined orientation on the carrier ring. The guide device is provided for changing an inflow to the turbine wheel 40. In this case, the guide device 50 may be provided as a cartridge, which is mounted in the turbine housing 20. In particular, the guide device 50 can be pre-assembled as a cartridge and mounted via at least three pins evenly spaced apart in the circumferential direction 26 on the turbine housing rear wall, in particular on a side of the bearing housing 30 facing the turbine housing 20. The adjustable guide vanes are adjustable between a first position, in particular a first end position, and a second position, in particular a second end position. A plurality of intermediate positions between the first and second position can be set. The first position corresponds to a maximally open position of the guide device 50. The second position corresponds to a minimally open position of the guide device 50. By this means, a fluid flow from the turbine housing inlet 21 can be variably guided through a flow channel, i.e. where the guide vanes are arranged, to the turbine wheel 40. Formed between adjacent guide vanes are nozzle cross sections (also called intermediate duct) which are larger or smaller depending on the current position of the guide vanes, and accordingly apply a greater or lesser amount of fluid of an internal combustion engine (e.g. exhaust gas) or of a fuel cell to the turbine wheel 40 mounted on the axis of rotation R in order, via the turbine wheel 40, to drive a compressor wheel 62 seated on the same shaft 70. The guide vanes each have a leading edge and a trailing edge. A position of the guide vanes may also be referred to as a position or operating position. Thus, every possible position of a guide vane during the operation of the turbine unit 10 is between the first position at maximum passage/flow cross section (i.e. maximally open) and the second position at minimum passage/flow cross section (i.e. minimally open or maximally closed). Every "possible position" can be understood as the position that can be provided during operation. A person skilled in the art knows that the operating positions change variably and automatically during the operation of the turbine. In order to control the movement or the position of the guide vanes, an actuating device 80 can be provided, which can be designed as desired per se, for example can be electronic or pneumatic. The actuating device 80 may be an actuator. In the example of FIG. 1, the actuating device 80 is pneumatically formed with a control housing (for example, a pressure capsule) and a plunger element that transmits the movement of the control housing via one or more intermediate elements, in particular via an adjusting shaft arrangement, to the guide device 50 or to the adjustable guide vanes. The guide device 50 can be arranged spaced apart in the radial direction 24 with respect to the turbine housing 20.

Figure 2:
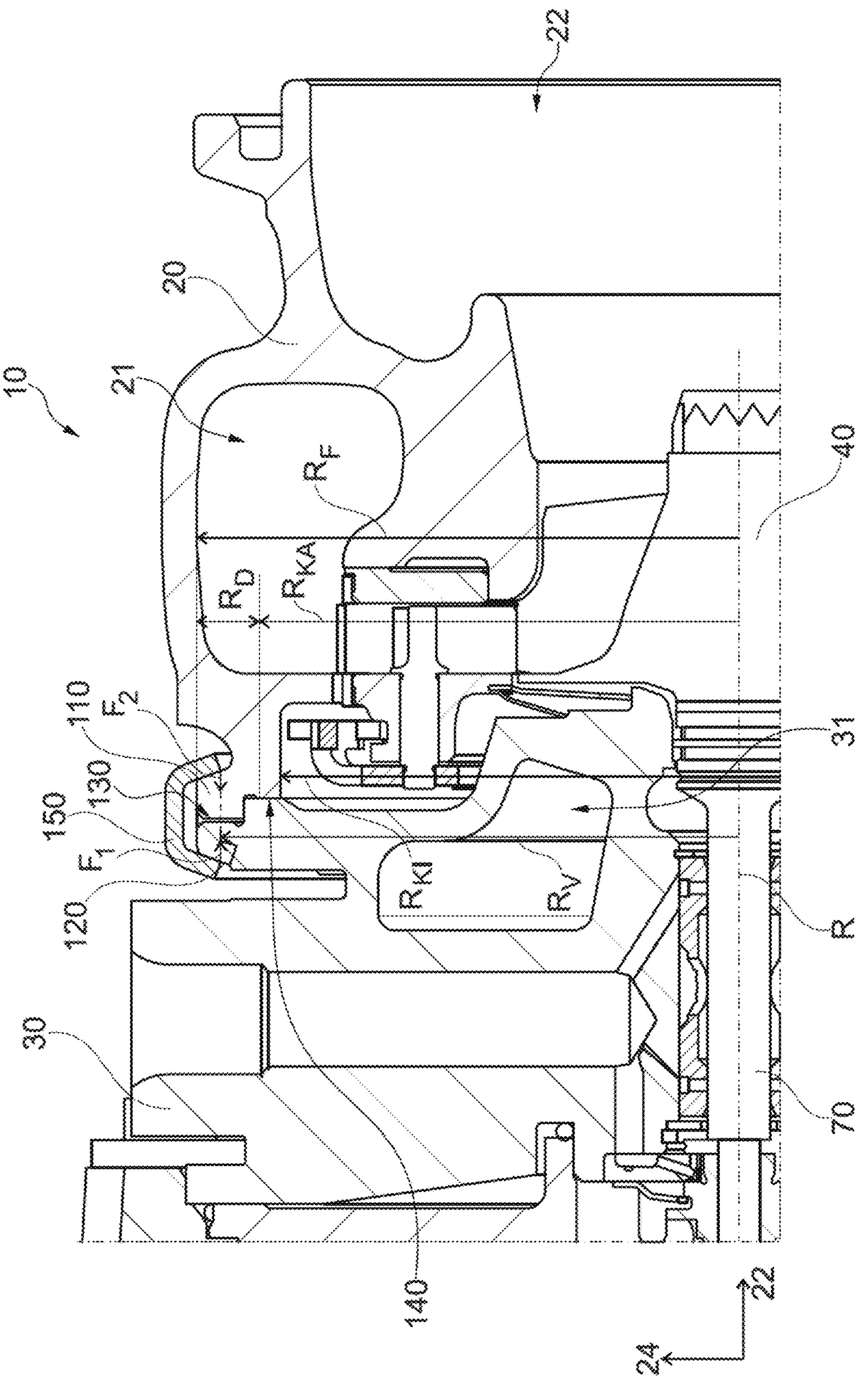
FIG. 2 shows a sectional view of the turbine unit with a flange connection according to a first refinement.
Figure 3A:
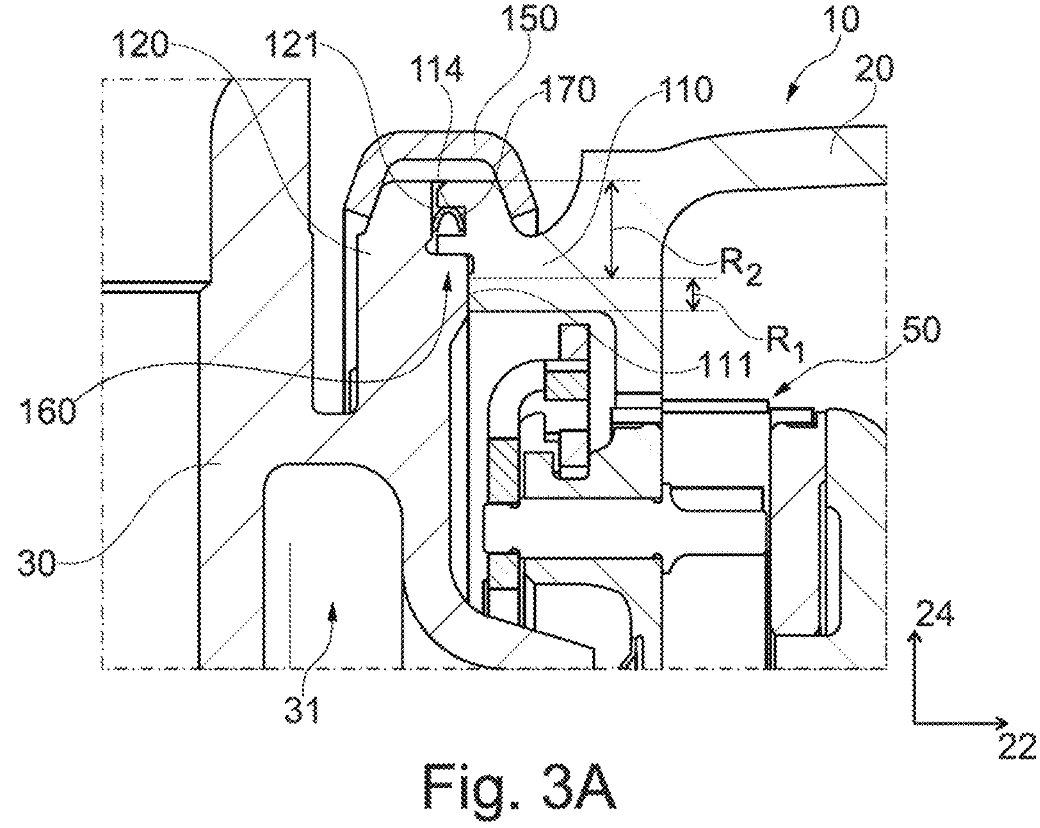
FIGS. 3A and 3B show detailed sectional views of the turbine unit from FIG. 2.
Figure 3B:
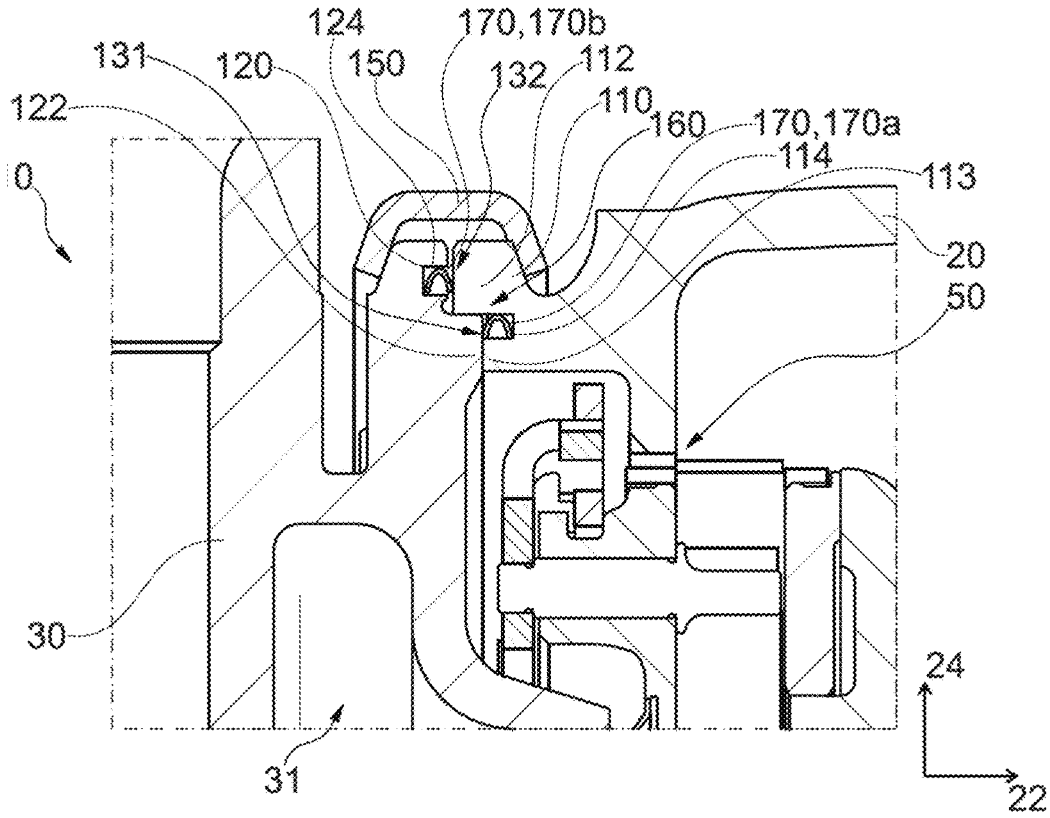
Figure 4:
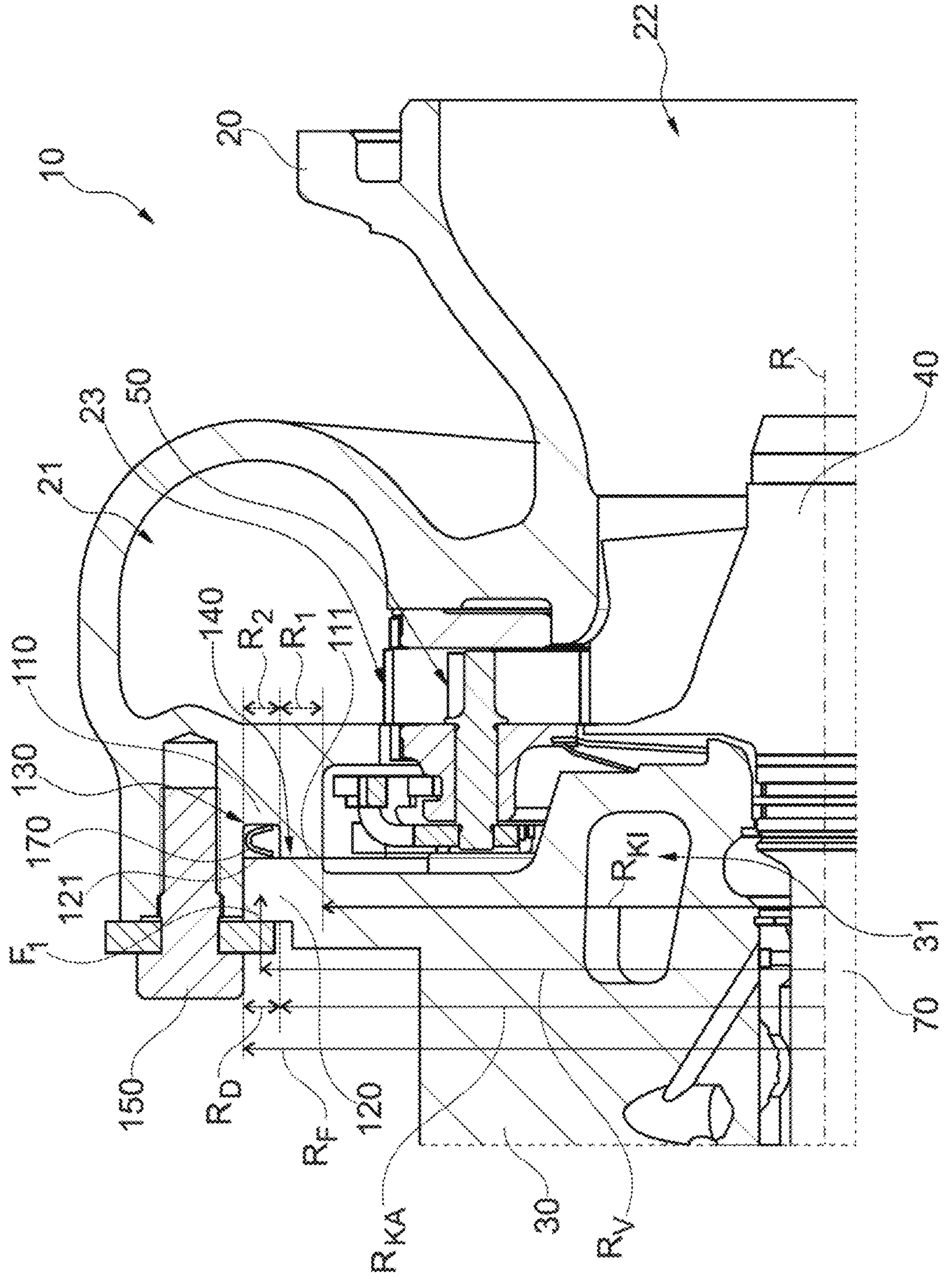
FIG. 4 shows a sectional view of the turbine unit with a flange connection according to a second refinement.

FIGS. 2 to 5D show refinements of the flange connection 100 between the turbine housing 20 and the bearing housing 30 according to aspects of the present application. The flange connection 100 comprises a turbine-housing-side flange 110 and a bearing-housing-side flange 120. The turbine-housing-side flange 110 and the bearing-housing-side flange 120 are designed and coupled to each other in such a way that they form an axial distance region 130 and an axial contact region 140 of the flange connection 100. The axial contact region 140 is arranged radially on the inside with respect to the axial distance region 130. As shown in FIGS. 2 and 4, the bearing-housing-side flange 110 comprises a circumferential radius $R_F$. The axial contact region 140 comprises an outer radius $R_{KA}$. A radial distance $R_D$ is defined between the outer radius $R_{KA}$ and the circumferential radius $R_F$, which radial distance is measured in particular in the radial direction 24 between the outer radius $R_{KA}$ and the circumferential radius $R_F$. The radial distance $R_D$ is at least 3.50 mm. In refinements, the radial distance $R_D$ can be at least 5.00 mm. As a result, the axial contact between the bearing housing 30 and the turbine housing 20, in particular between the bearing-housing-side flange 120 and the turbine-housing-side flange 110, can be shifted further radially inward from a region close to the outer diameter or the circumferential radius $R_F$ of the bearing-housing-side flange 120. As a result, heat transmission from the turbine housing 20 to the bearing housing 30 and a maximally occurring temperature is shifted onto a smaller radius where the sensitivity to crack formation in the bearing-housing-side flange 120 is lower, and heat dissipation or cooling can be provided in an improved manner. During operation, the turbine unit 10 may be exposed in particular to a plurality of temperature cycles. The shifting of the axial contact region 140 by at least 3.5 mm radially inward may improve force transmission in the flange connection 100 during a temperature cycle (in which various thermal expansions may be present), resulting in a lower mechanical load on the bearing-housing-side flange 120. This can save costs since, e.g., the bearing-housing-side flange 120 and the bearing housing 30 do not have to be provided from a higher quality material for high temperature use. The design according to the invention of the flange connection 100 can significantly increase the service life of the bearing-housing-side flange 120. The advantageous effects described here can be provided in particular when the turbine unit 10 comprises a guide device 50 in the form of a variable turbine geometry and is used together with a (gasoline) internal combustion engine 3. This is because, especially in this refinement, high exhaust gas temperatures (often above 850° C.) can occur in the turbine housing 20, as a result of which the flange connection 100, in particular the turbine-housing-side flange 110 and the bearing-housing-side flange 120, has to be larger in size (e.g. in comparison to applications in which no guide device is provided, the turbine unit only has a wastegate, and/or no (gasoline) internal combustion engine is provided). The advantageous effects described here can also be provided for this application area by the optimized flange connection 100 according to the invention.

The turbine-housing-side flange 110 and the bearing-housing-side flange 120 should be understood as meaning components that are designed accordingly for the purpose of connection with the respective other one. These can have correspondingly designed structures and surfaces, which are described in more detail further below. The axial contact region 140 and the axial distance region 130 should be understood as meaning regions of the flange connection 100, which are aligned in the axial direction 22. The axial contact region 140 is the region in which an axial contact in the axial direction 22 is present between the turbine-housing-side flange 110 and the bearing-housing-side flange 120. As shown in FIGS. 2 to 5D, the turbine-housing-side flange 110 and the bearing-housing-side flange 130 can be in axial contact, in particular in direct or immediate axial contact, in the axial contact region 140. In refinements (not shown in the Figures), an intermediate component can be provided or clamped between the turbine-housing-side flange 110 and the bearing-housing-side flange 120 such that the turbine-housing-side flange 110 and the bearing-housing-side flange 120 are in indirect or indirect axial contact. The intermediate component may be, for example, a thermal insulation element, a bracing element (such as a disk spring) and/or a heat shield. The axial distance region 130 can extend in the radial direction 24 between the outer radius of the axial contact region $R_{KA}$ and the circumferential radius $R_F$ of the bearing-housing-side flange 120. The bearing-housing-side flange 120 and the turbine-housing-side flange 110 can be configured in each case annularly and extending in the radial direction 24.

More specifically, as shown in FIGS. 2 to 5D, the turbine-housing-side flange 110 can have a first axial surface 111 and the bearing-housing-side flange 120 can have a second axial surface 121. The axial surfaces 111, 121 mean the surfaces that are oriented in the axial direction 22. The first axial surface 111 and the second axial surface 121 are arranged opposite each other in the axial direction 22 in the flange connection 100 (in particular at the corresponding radial position). More specifically, the axial surfaces 111, 121 are each annular surfaces which extend in the radial direction 24 and lie opposite each other in the flange connection 100, i.e. between an inner circumference and an outer circumference of the flange connection 100, as seen in the axial direction 22 (in particular at the corresponding radial position). In the refinements shown in FIGS. 2 and 4, the axial surfaces 111, 121 extend in the radial direction 24 between an inner circumference (or an inner circumferential radius) of the turbine housing 20 directly on the turbine-housing-side flange 110 and the circumferential radius $R_F$ of the bearing-housing-side flange 120. In the axial distance region 130, the first axial surface 111 and the second axial surface 121 are spaced apart in the axial direction. In other words, the axial surfaces 111, 121 are spaced apart from each other by an axial gap in the axial distance region 130. As shown in FIGS. 2 to 5D, the axial surfaces 111, 121 can be continuously spaced apart from each other in the axial direction 22 in the axial distance region 130. In particular, the axial surfaces 111, 121 between the outer radius $R_{KA}$ of the axial contact region 140 and the circumferential radius $R_F$ of the bearing-housing-side flange 120 can be continuously spaced apart from each other in the axial direction 22. As shown in FIGS. 2 to 5D, the axial surfaces 111, 121 contact each other in the axial contact region 140.

The turbine-housing-side flange 110 and the bearing-housing-side flange 120 can be continuously spaced apart from each other in the axial direction 22, in particular in the axial distance region 130. The axial contact region 140 is arranged in the radial direction 24 directly adjacent to the axial distance region 130. In other words, the axial contact region 140 is arranged in the radial direction 24 directly radially within the axial distance region 130 and is directly connected thereto. The axial contact region 140 extends in the radial direction 24 between an inner radius $R_{KI}$ of the axial contact region 140 and the outer radius $R_{KA}$. In particular, when seen in the axial contact region 140 and in the radial direction 24, the turbine-housing-side flange 110 and the bearing-housing-side flange 120 can be continuously in axial contact between the inner radius $R_{KI}$ and the outer radius $R_{KA}$. The inner radius $R_{KI}$ can correspond to an inner radius of the turbine housing 10 proximal to the bearing-housing-side flange 120 or directly to the turbine-housing-side flange 110. In the axial contact region 140, a force, in particular a clamping force, can be applied or transmitted between the turbine-housing-side flange 110 and the bearing-housing-side flange 140. By reducing axial and radial contact surfaces (or contact cross sections) between the turbine-housing-side flange 110 and the bearing-housing-side flange 120, heat transmission to the bearing housing 30 can be reduced.

As shown in FIGS. 2 to 5D, the bearing-housing-side flange 120 can be formed integrally or in one piece with the bearing housing 30. The turbine-housing-side flange 110 can be formed integrally or in one piece with the turbine housing 20. The bearing housing 30 and/or the turbine housing 20 can be produced as a cast component. For example, the bearing housing 30 can be produced from gray cast iron. In refinements, the bearing housing 30 and/or the turbine housing 20 can be produced from cast steel. In one refinement, the bearing housing 30 can be produced from gray cast iron and the turbine housing 20 from cast steel. The bearing-housing-side flange 120 and the turbine-housing-side flange 110 can then be machined accordingly for the purpose of coupling or connecting via the flange connection 100. In refinements (not shown in the Figures), the bearing-housing-side flange 120 and/or the turbine-housing-side flange 110 may be configured as a separate, annular (or disk-shaped) component and coupled to the respective one of the bearing housing 30 and the turbine housing 20.

Figure 5A:
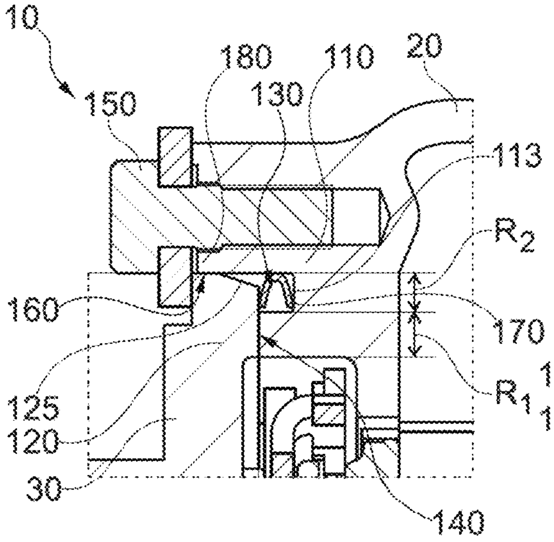
FIGS. 5A to 5D show detailed sectional views of the turbine unit from FIG. 4.
Figure 5B:
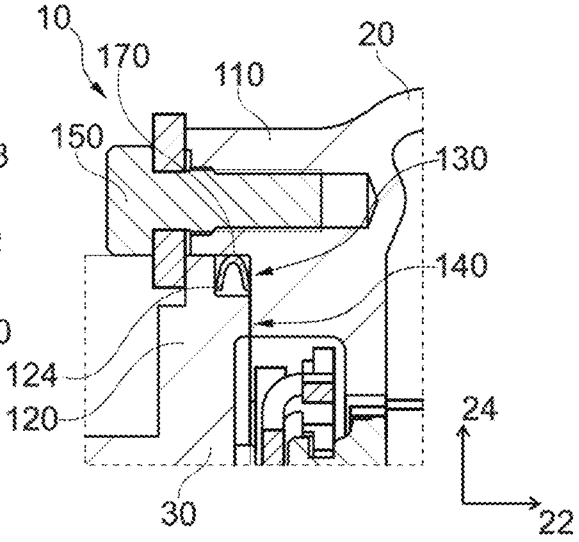
Figure 5C:
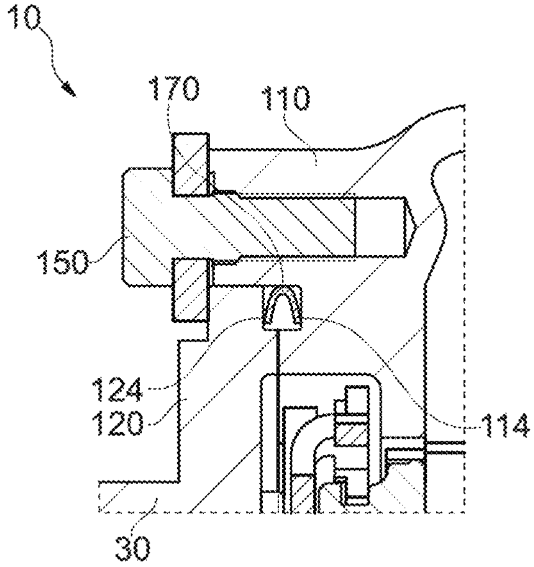

As shown in FIGS. 3A and 4, the axial contact region 140 has a first radial width R1, which is measured in particular in the radial direction 24 between the inner radius $R_{KI}$ and the outer radius $R_{KA}$ of the axial contact region 140. The axial distance region 130 has a second radial width R2, which is measured in particular in the radial direction 24 between the outer radius $R_{KA}$ of the axial contact region 140 and the circumferential radius $R_F$ of the bearing-housing-side flange 120. The second radial width R2 can correspond here in particular to the radial distance $R_D$. A ratio R1/R2 of the first radial width R1 to the second radial width R2, in particular to the radial distance $R_D$, can be in the range from 0.20 to 0.70 here. In the refinement of FIGS. 2 to 3B, the ratio can lie in particular in the range from 0.20 to 0.45, more precisely in the range from 0.24 to 0.30. In the refinement of FIGS. 4 to 5B, the ratio can lie in particular in the range from 0.35 to 0.65, more precisely in the range from 0.40 to 0.60, especially in the range from 0.42 to 0.58. In addition to the advantageous effects of the radial shifting of the contact point radially inward, an axial contact cross section between the bearing-housing-side flange 120 and the turbine-housing-side flange 110, via which heat can be transmitted axially from the turbine housing 20 to the bearing housing 30, can be reduced with reference to said ratios. In addition, this ratio makes it possible to improve force transmission of the axial clamping force, which is applied in the axial direction 22 between the bearing-housing-side flange 120 and the turbine-housing-side flange 110, in particular in the axial contact region 140. In particular, during a temperature cycle in which different thermal expansions may be present in the flange connection, force transmission in the flange connection 100 can be provided more moderately or more constantly. As a result, this ratio can reduce a temperature load and/or a mechanical load on the bearing-housing-side flange, can reduce cracking and can increase the service life. As described above, the turbine unit 10 may be exposed in particular to a plurality of temperature cycles during operation. FIG. 6 shows a diagram with a force curve in the flange connection 100, in particular an axial clamping force in the axial contact region 140, during a temperature cycle. In particular, the temperature cycle may also be referred to as a temperature change cycle. This can comprise cyclic heating to an operating temperature with subsequent cooling, such as in overrun mode. The respective force curve could be determined by appropriate tests. In the diagram of FIG. 6, the force is plotted on the ordinate as a percentage [%] over a period t (see abscissa) of the temperature cycle. The force can lie here in particular in the range of kilo-newtons [kN] and is applied in the range of 0% to 100% with respect to a maximum design force. The period t can be in the range of several minutes. The graph B shown by a continuous line shows the force curve (in particular of the axial clamping force) during a temperature cycle for a conventional flange connection in which an axial contact region is provided axially on the outside (i.e. directly adjacent to the circumferential radius of the bearing-housing-side flange). The graph N shown by dashed lines shows the force curve (in particular of the axial clamping force) during a temperature cycle for a flange connection 100 according to the present invention (for example, for a refinement as in FIG. 2), in which the axial contact region 140 is shifted radially inward, as described above, and a ratio R1/R2 is present, as described above. On the basis of graphs B, N it can be seen that both flange connections initially have a similar clamping force in the axial contact region, especially in the force range of just over 50%. At a time t1 of the temperature cycle, the conventional connection (see graph B) exhibits a force peak in its force curve and from a time t2 to a time t3 of the temperature cycle drops to a force trough in the conventional flange connection. The force peak and the force trough in the conventional flange connection (see graph B) mean that the conventional flange connection experiences a greater variation of forces, which lead to a higher mechanical load on the flange connection. In contrast, a flange connection 100 according to the invention (see graph N) allows a very moderate force curve without force peaks and force troughs, which leads to a lower mechanical load on the components of the flange connection 100 and thus allows for lower cracking in the bearing-housing-side flange 120, and also a longer service life. For example, as shown in FIG. 6, the flange connection 100 according to the invention has a clamping force of approx. 50% at the time $t_1$. The flange connection 100 according to the invention has a clamping force of nearly 30% at the time $t_3$. On the other hand, the conventional flange connection has a force peak, which is nearly 90%, at the time $t_1$. The conventional flange connection has a force trough, which is less than 20% of the force, at the time $t_3$.

Figure 5D:
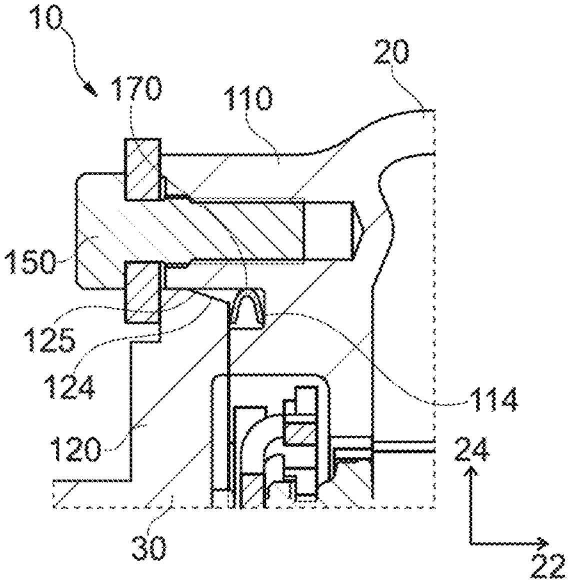
Figure 6:
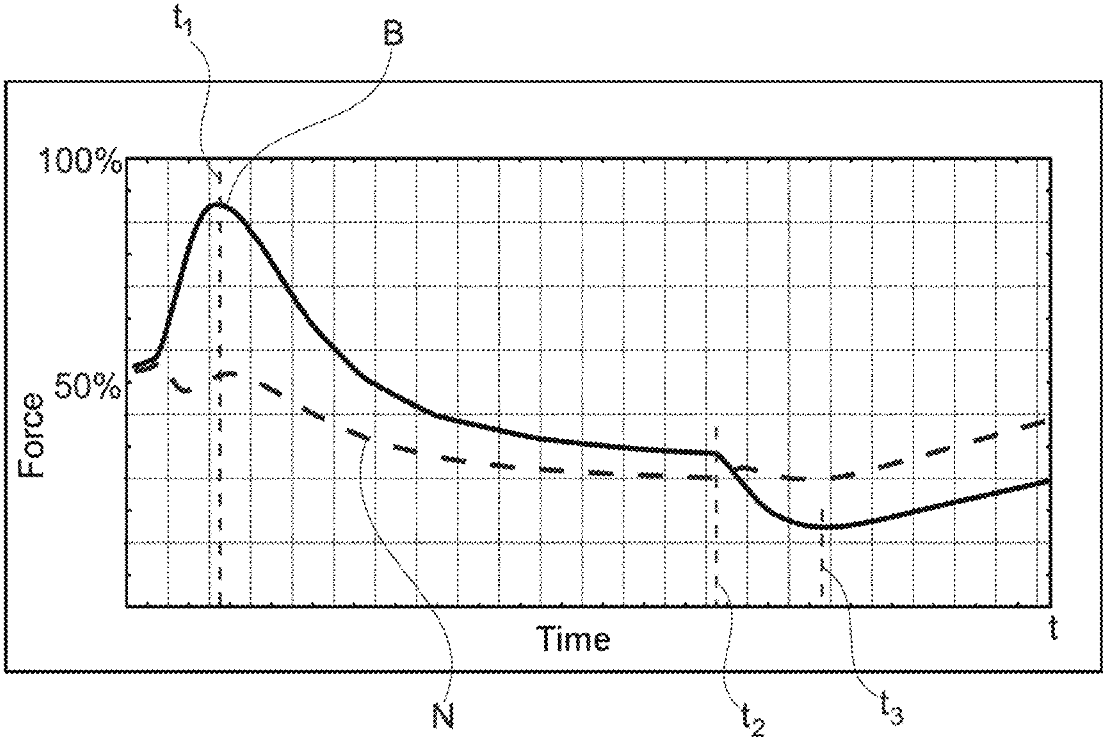
FIG. 6 shows a diagram with force curves in the flange connection during a temperature cycle.

As shown in FIGS. 2 to 5D, the turbine-housing-side flange 110 and the bearing-housing-side flange 120 are designed and coupled to each other in such a way that they form at least one shoulder 160, which provides a radial centering surface pairing. In particular, the turbine-housing-side flange 110 and the bearing-housing-side flange 120 can form a shoulder 160 in which radial surfaces of the turbine-housing-side flange 110 and of the bearing-housing-side flange 120 contact each other. Radial surfaces should be understood as meaning surfaces that are oriented in the radial direction 24. The radial surfaces are in particular surfaces opposite each other in the radial direction 24 (in particular at the same axial position). A radial bearing, in particular a centering of the turbine-housing-side flange 110 with respect to the bearing-housing-side flange 120 can be provided by the shoulder 160. The shoulder 160 may be at least one shoulder. For example, the turbine-housing-side flange 110 and the bearing-housing-side flange 120 may be designed and coupled to each other in such a way that they provide a first radially outer shoulder 160 and at least one second radially inner shoulder. In the refinement as shown in FIGS. 4 to 5D, the shoulder 160 may be formed between an outer circumferential surface of the bearing-housing-side flange 120 and a collar 180, which extends in the axial direction 22, of the turbine-housing-side flange 110, which at least partially circumferentially surrounds the bearing-housing-side flange 120. The collar 180 can also completely surround the bearing-housing-side flange 120 circumferentially. In the refinement as shown in FIGS. 2 to 3B, the shoulder 160 may be formed in the radial direction 24 in the flange connection 100 between the circumferential radius $R_F$ and the inner radius $R_{KI}$. In order to form the shoulder 160, the bearing-housing-side flange 120 or the turbine-housing-side flange 110 can have an axial projection 112, 122, which extends at least partially into a fold (or a step) or a depression in the respective other of the bearing-housing-side flange 120 and the turbine-housing-side flange 110 such that an overlap in the axial direction 22 and a bearing in the radial direction 24 (by contacting opposite radial surfaces) can be provided. In the refinement of FIGS. 2 to 3B, the turbine-housing-side flange 110 has, on its outer circumference, an axial projection 112 and a radially inner fold (or a step) with respect thereto. The bearing-housing-side flange 120 has a radially inner axial projection 112 and a radially outer fold (or a step) with respect thereto. The respective folds and projections 112, 122 are formed circumferentially. The respective projections 112, 122 extend at least partially into the respective folds, and overlap in the axial direction 22. As a result, radial surfaces of the projections can form the corresponding centering surface pairing. The above-described refinement can also be provided precisely the other way around (i.e. bearing-housing-side flange 120 and turbine-housing-side flange 110 swapped). Also the refinement of FIGS. 2 to 3B may include more than one shoulder 160.

In refinements, the at least one shoulder 160 can be arranged radially within the axial distance region 130. For example, the shoulder 160 can be arranged in the axial contact region 140. As shown in FIGS. 2 to 3B, the shoulder 160 can be arranged in the axial distance region 130. In refinements, a first shoulder 160 and at least one second shoulder 160 can be provided in the axial distance region 130 and/or in the axial contact region 140. In refinements, the at least one shoulder 160 can divide the axial distance region 130 into a first axial distance region 131 and at least one second axial distance region 132 (see e.g. FIG. 2). The first axial distance region 131 can be arranged spaced apart or offset in the axial direction 22 with respect to the second axial distance region 132. The first axial distance region 131 can be arranged in the radial direction 24 between the shoulder 160 and the axial contact region 140. The second axial distance region 132 can be arranged in the radial direction 24 between the shoulder 160 and the circumferential radius $R_F$ of the bearing-housing-side flange 120 (see e.g. FIG. 2). If an intermediate component is provided as described above, this may be provided spaced apart from the shoulder 160 in the radial direction 24 such that the first axial distance region 131 can be provided by an axial width of the intermediate component (alternatively or in addition to the annular depression 114, 124). In refinements, the axial contact region 140 can comprise a first axial contact region and at least one second axial contact region, which are offset or spaced apart with respect to each other in the axial direction 22. In this case, the shoulder 160 (or at least one shoulder) can be located in the axial contact region 140, and in particular between the first axial contact region and the at least one second axial contact region.

As shown in FIGS. 2 to 5D, the turbine-housing-side flange 110 can have at least one radially inner annular projection 113, which extends in the axial direction 22 toward the bearing-housing-side flange 120 and forms an axial contact surface which is in contact with the bearing-housing-side flange 120. The axial contact surface can form the axial contact region 140 here. The axial distance region 130 (and/or the first axial distance region 131) can be in the form of at least one annular depression 114, 124 in the bearing-housing-side flange 120 and/or in the turbine-housing-side flange 110.

With reference to FIGS. 2 to 5D, the flange connection 100 comprises at least one connecting element 150, which couples the turbine-housing-side flange 110 and the bearing-housing-side flange 120 to each other. In particular, the connecting element 150 is coupled to the turbine-housing-side flange 110 and the bearing-housing-side flange 120 in such a way that it generates a clamping force between the turbine-housing-side flange 110 and the bearing-housing-side flange 120 in the axial contact region 140. The connecting element 150 thus applies an axial force $F_1$, $F_2$, which acts from the bearing-housing-side flange 120 in the direction of the turbine-housing-side flange 110 (or vice versa). The axial force $F_1$, $F_2$ can generate the axial clamping force in the axial contact region 140 (or is transmitted there accordingly). In other words, the axial force $F_1$, $F_2$ is transmitted directly as a clamping force in the axial contact region 140. The axial force $F_1$, $F_2$ can be applied extensively to the bearing-housing-side flange 120 and/or the turbine-housing-side flange 110. The connecting element 150 can be arranged in the radial direction 24 in the axial distance region 130, i.e. radially outside the axial contact region 140. In other words, the connecting element 150 can be arranged in the radial direction 24 in such a way that it generates an axial force $F_1$, $F_2$ between the turbine-housing-side flange 110 and the bearing-housing-side flange 120 in the axial distance region 130. A radial position $R_V$ of the axial force $F_1$, $F_2$ applied by the connecting element lies here radially outside the axial contact region 140, in particular radially outside the outer radius $R_{KA}$. If a shoulder 160 is provided in the flange connection 100 in the axial distance region 130, the radial position $R_V$ of the axial force $F_1$, $F_2$ applied by the connecting element 150 can lie radially outside the shoulder 160 (or radially inside, for example, if the axial distance region 130 then comprises the first axial distance region 131 and the at least one second distance region 132). If a first shoulder 160 and at least one radially inner second shoulder 160 with respect thereto are provided, the radial position $R_V$ can lie radially outside the first shoulder or between the shoulders.

As shown in the refinement in FIGS. 2 to 3B, the connecting element 150 can be a V-belt clip. The connecting element 150 can be arranged here circumferentially around the turbine-housing-side flange 110 and the bearing-housing-side flange 120. In this case, the connecting element 150 engages around the turbine-housing-side flange 110 and the bearing-housing-side flange 120 in such a way that a tensioning force of the connecting element 150 radially inward generates the axial force $F_1$, $F_2$ described above in the axial distance region 130 and consequently the axial clamping force in the axial contact section 140. In the refinement of FIGS. 4 to 5D, the connecting element 150 is provided in the form of at least one axial screw connection. The screw connection in the axial direction 22 generates the axial force $F_1$ described above in the axial distance region 130 and consequently the axial clamping force in the axial contact section 140. In particular, the screw connection can have a screw element and a stop washer. The screw element is axially connected to the collar 180, which extends in the axial direction 22, of the turbine-housing-side flange 110. The stop washer is braced between the collar 180 and the screw element and transmits an axial force $F_1$ to the bearing-housing-side flange 110 on a radially inner section, thereby generating the axial clamping force in the axial contact section 140. In particular, the at least one screw connection can have a plurality of screw connections distributed in the circumferential direction.

As shown in FIGS. 2 to 5D, the bearing housing 30 can have at least one annular cooling channel 31, which can be arranged radially on the inside with respect to the bearing-housing-side flange 120 and proximally (or adjacent) to a side surface of the bearing housing 30 facing the turbine housing 20. The annular cooling channel 31 is formed in particular in the bearing housing 30. Said cooling channel can be arranged in the axial direction 22 between an oil supply hole and the side surface of the bearing housing facing the turbine housing 20. On the basis of the bearing housing 30 with the at least one cooling channel, improved heat dissipation from the bearing-housing-side flange 120 can be provided. Together with the shifting of the axial contact region 140 radially inward, a thermal load on the bearing-housing-side flange 120 can be reduced and thus cracking can be reduced. This can increase the service life of the bearing-housing-side flange 120.

As shown in FIGS. 2 to 5D, the flange connection 100 can have at least one sealing element 170, which is clamped in the axial direction 22 between the turbine-housing-side flange 110 and the bearing-housing-side flange 120. In particular, the at least one sealing element 170 can be clamped in the axial distance region 130. The sealing element 170 is in particular annularly and circumferentially clamped between the turbine-housing-side flange 110 and the bearing-housing-side flange 120. The at least one sealing element 170 can be arranged radially outside and/or radially inside the at least one shoulder 160. The at least one sealing element 170 can be a V-ring. In refinements, the at least one sealing element 170 (in addition or alternatively) can also be provided in a circumferential groove in the axial contact region 140. As shown in FIGS. 3A and 3B, the at least one sealing element 170 can be clamped in the first axial distance region 131 and/or in the second axial distance region 132. The sealing element 170 can comprise a first sealing element 170*a*, which is clamped in the first axial distance region 131, and at least one second sealing element 170*b*, which is clamped in the second axial distance region 132.

The bearing-housing-side flange 120 and/or the turbine-housing-side flange 110 can have at least one annular depression 114, 124 in which the at least one sealing element 170 is arranged. The at least one annular depression 114, 124 may be in particular a circumferential groove. According to FIGS. 3A and 4 to 5D, the turbine-housing-side flange 110 and/or the bearing-housing-side flange 120 can comprise at least one annular depression 114, 214, in which the at least one sealing element 170 is arranged, in the axial distance section 130. The at least one annular depression 114, 214 is provided in each case in the axial direction 22 between the turbine-housing-side flange 110 and the bearing-housing-side flange 120, in particular in the respective axial surfaces 111, 121. A radial position of the at least one annular depression 114, 214 and of the sealing element 170 can substantially correspond to the radial position $R_V$ of the applied axial force $F_1$, $F_2$. This can provide an improved sealing effect. In the refinement in FIGS. 3A, 5A, 5C and 5D, the turbine-housing-side flange 110 has an annular depression 114, which is substantially located in the radial direction at the radial position $R_V$ of the applied axial force $F_1$, $F_2$. The sealing element 170, **170*b* is arranged in the annular depression 114. As shown in FIGS. 3B, 5B and 5C, the annular depression 124 can also be correspondingly arranged in addition or alternatively in the bearing-housing-side flange 120. With reference to FIG. 3B, an annular depression 114 can alternatively or additionally be provided radially within the shoulder 160 in the turbine-housing-side flange 110 and/or in the bearing-housing-side flange 120. A sealing element 170 can be arranged in said annular depression 114. In particular, the annular depression 114 can be provided directly adjacent to the axial contact region 140. This allows a defined clamping force to be applied to the sealing element 170. As shown in FIGS. 5A and 5D, at least one radial surface 125 of the centering surface pairing of the at least one shoulder 160 can be chamfered at least in sections in the axial direction 22. In particular, the chamfer can be provided between a radial surface of the shoulder 160 and the axial contact region 140 or the axial distance region 130. Thus, a radial contact cross-sectional area between the turbine-housing-side flange 110 and the bearing-housing-side flange 120 (in particular between the radial surfaces) can be reduced and heat transmission from the turbine housing 20 to the bearing housing 30 reduced. Together with the reduced axial contact cross section by the described axial contact region 140**, the heat transmission can therefore be further reduced.

Figure 7:
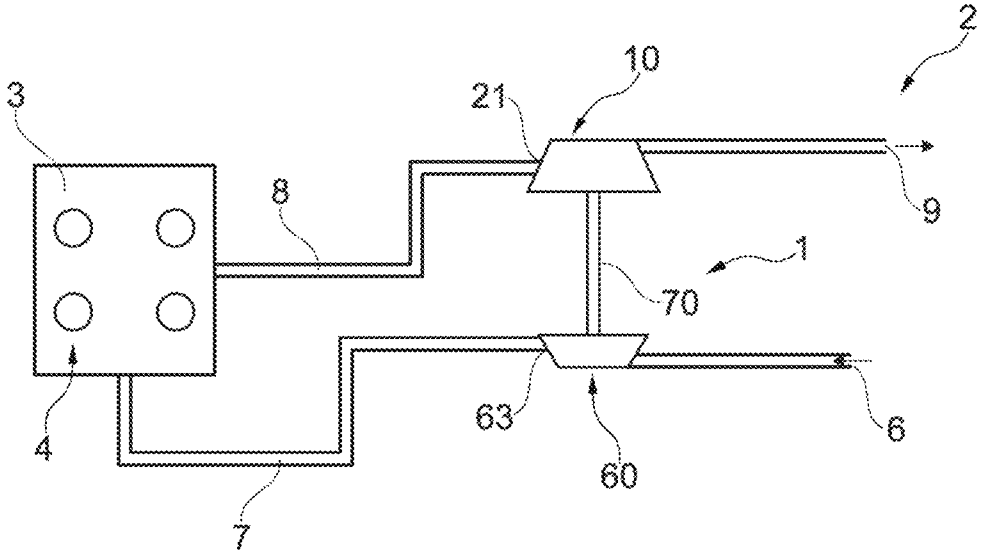
FIG. 7 shows a schematic view of an engine system with the supercharging device.

FIG. 7 shows a schematic view of an engine system 2 with the supercharging device 1 from FIG. 1, which has the turbine unit 10 according to the invention. 32. The engine system 2 comprises the supercharging device 1 with the turbine unit 10 and an internal combustion engine 3. The internal combustion engine 3 can have a plurality of cylinders 4. The turbine unit is arranged downstream of the internal combustion engine 3. The turbine housing inlet 21 of the turbine housing 20 is fluidically connected to the internal combustion engine 3 (more specifically to the plurality of cylinders 4), in particular via a first connecting line 8. As described above, the turbine unit 10 can comprise the guide device 50 (not shown in FIG. 7), in particular with a plurality of adjustable guide vanes. The compressor 60 is arranged upstream of the internal combustion engine 3. A compressor housing outlet 63 of the compressor housing 61 is fluidically connected to the internal combustion engine 3, in particular via a second connecting line 7. A compressor housing inlet of the compressor 60 is fluidically connected to an atmosphere-side inlet 6 upstream of the compressor 60. The turbine housing outlet 22 is fluidically connected to an outlet 9 downstream of the turbine unit 10. The above-described advantageous effects of the flange connection 100 can also be provided in particular for the combination of the internal combustion engine 3 with the turbine unit 10 and the guide device 50 in the form of the variable turbine geometry (i.e. with the plurality of adjustable guide vanes). The guide device 50 can additionally also comprise fixed guide vanes, as described above.

Although the present invention has been described above and defined in the appended claims, it should be understood that the invention may alternatively also be defined in accordance with the following embodiments:

1. A turbine unit (10) for a supercharging device (1), comprising:
   a bearing housing (30), and
   a turbine housing (20), which is coupled to the bearing housing (30) via a flange connection (100), the flange connection (100) comprising:
   a turbine-housing-side flange (110), and
   a bearing-housing-side flange (120),
   the turbine-housing-side flange (110) and the bearing-housing-side flange (120) being designed and coupled to each other in such a way that they form an axial distance region (130) and an axial contact region (140) of the flange connection (100),
   the axial contact region (140) being arranged radially on the inside with respect to the axial distance region (130),
   wherein a radial distance ($R_D$) between an outer radius of the axial contact region ($R_{KA}$) and a circumferential radius ($R_F$) of the bearing-housing-side flange (120) is at least 3.50 mm.
2. The turbine unit (10) according to embodiment 1, wherein the turbine-housing-side flange (110) and the bearing-housing-side flange (120) are in axial contact directly with each other in the axial contact region (140).
3. The turbine unit (10) according to embodiment 1 or embodiment 2, wherein the turbine-housing-side flange (110) and the bearing-housing-side flange (120) are continuously spaced apart from each other in the axial distance region (130) in the axial direction (22).
4. The turbine unit (10) according to any one of the preceding embodiments, wherein the axial distance region (130) extends in the radial direction (24) between the outer radius of the axial contact region ($R_{KA}$) and the circumferential radius ($R_F$) of the bearing-housing-side flange (120).
5. The turbine unit (10) according to any one of the preceding embodiments, wherein the axial contact region (140) is arranged directly adjacent to the axial distance region (130) in the radial direction (24).
6. The turbine unit (10) according to any one of the preceding embodiments, wherein the axial contact region (140) extends in the radial direction (24) between an inner radius ($R_{KI}$) of the axial contact region (140) and the outer radius ($R_{KA}$).
7. The turbine unit (10) according to embodiment 6, wherein the inner radius ($R_{KI}$) of the axial contact region (140) corresponds to an inner radius of the turbine housing (10) proximal to the bearing-housing-side flange (110).
8. The turbine unit (10) according to any one of the preceding embodiments, wherein the flange connection (100) comprises at least one connecting element (150) which is coupled to the turbine-housing-side flange (110) and the bearing-housing-side flange (120) in such a way that it generates an axial clamping force between the turbine-housing-side flange (110) and the bearing-housing-side flange (120) in the axial contact region (140).
9. The turbine unit (10) according to embodiment 8, wherein the connecting element (150) is arranged in the radial direction (24) in such a way that it generates an axial force ($F_1$, $F_2$) between the turbine-housing-side flange (110) and the bearing-housing-side flange (120) in the axial distance region (130), in particular wherein the clamping force is generated by the axial force ($F_1$, $F_2$).
10. The turbine unit (10) according to embodiment 8 or embodiment 9, wherein a radial position ($R_V$) of the axial force ($F_1$, $F_2$) generated by the connecting element (150) lies radially outside the axial contact region (140).

11. The turbine unit (10) according to any of the preceding embodiments 8 to 10, wherein the connecting element (150) is a V-belt clip or a screw connection.
12. The turbine unit (10) according to any one of the preceding embodiments, wherein the axial contact region (140) has a first radial width ($R_1$), and wherein the axial distance region (130) has a second radial width ($R_2$), wherein a ratio of the first radial width ($R_1$) to the second radial width ($R_2$) lies in a range of 0.20 to 0.70.
13. The turbine unit (10) according to embodiment 12, wherein the ratio lies in a range of 0.20 to 0.45, in particular wherein the ratio lies in a range of 0.24 to 0.30.
14. The turbine unit (10) according to any one of the preceding embodiments, wherein the turbine-housing-side flange (110) and the bearing-housing-side flange (120) are designed and coupled to each other in such a way that they form at least one shoulder (160), which provides a radial centering surface pairing.
15. The turbine unit (10) according to embodiment 14, wherein the shoulder (160) is formed between an outer circumferential surface of the bearing-housing-side flange (120) and a collar (180), which extends in the axial direction (22), of the turbine-housing-side flange (110), which surrounds the bearing-housing-side flange (120).
16. The turbine unit (10) according to embodiment 14, wherein the shoulder (160) is arranged in the radial direction (22) in the axial distance region (130).
17. The turbine unit (10) according to embodiment 14 or embodiment 16, wherein the shoulder (160) divides the axial distance region (130) into a first axial distance region (131) and at least one second axial distance region (132), wherein the first axial distance region (131) is arranged in the radial direction (24) between the shoulder (160) and the axial contact region (140), and wherein the second axial distance region (132) is arranged in the radial direction (24) between the shoulder (160) and the circumferential radius ($R_F$) of the bearing-housing-side flange (120).
18. The turbine unit (10) according to any one of the preceding embodiments, wherein the turbine-housing-side flange (110) has an annular projection (113) which extends in the axial direction (22) toward the bearing-housing-side flange (120) and forms an axial contact surface which is in contact with the bearing-housing-side flange (120).
19. The turbine unit (10) according to embodiment 17 or embodiment 18, wherein the first axial distance region (131) is designed as an annular depression in the bearing-housing-side flange (120) and/or in the turbine-housing-side flange (110).
20. The turbine unit (10) according to any one of the preceding embodiments, wherein the flange connection (100) has at least one sealing element (170), which is clamped between the turbine-housing-side flange (110) and the bearing-housing-side flange (120) in the axial distance region (130).
21. The turbine unit (10) according to embodiment 20, when dependent on embodiment 17, wherein the sealing element (170) is clamped in the first axial distance region (131).
22. The turbine unit (10) according to embodiment 20 or embodiment 21, when dependent on embodiment 17, wherein the sealing element (170) is clamped in the second axial distance region (132).
23. The turbine unit (10) according to any one of embodiments 20 to 22, wherein the bearing-housing-side flange (120) and/or the turbine-housing-side flange (110) has at least one annular depression (114, 124) in which the sealing element (170) is arranged.
24. The turbine unit (10) according to any one of the preceding embodiments, wherein the bearing-housing-side flange (120) is formed integrally with the bearing housing (30) and wherein the turbine-housing-side flange (110) is formed integrally with the turbine housing (20).
25. The turbine unit (10) according to any one of the preceding embodiments, wherein the bearing-housing-side flange (120) and the turbine-housing-side flange (110) are configured in each case annularly and extending in the radial direction (24).
26. The turbine unit (10) according to any one of the preceding embodiments, wherein the bearing housing (30) has at least one annular cooling channel (31), which is arranged radially on the inside of the bearing-housing-side flange (120) and proximally to a side surface of the bearing housing (30) facing the turbine housing (20).
27. The turbine unit (10) according to any one of the preceding embodiments, comprising a turbine wheel (40), which is arranged in a receiving space (23) of the turbine housing (20) between a turbine housing inlet (21) and a turbine housing outlet (22).
28. The turbine unit (10) according to embodiment 27, comprising a guide device (50), which is arranged in the receiving space (23) radially outside the turbine wheel (40) and surrounds the turbine wheel (40) circumferentially.
29. The turbine unit (10) according to embodiment 28, wherein the guide device (50) is arranged spaced apart in the radial direction (24) with respect to the turbine housing (20).
30. A supercharging device (1) for an internal combustion engine or a fuel cell, comprising:
    a turbine unit (10) according to any one of the preceding embodiments, and
    a compressor (60) with a compressor housing (61),
    the compressor housing (61) being coupled to the bearing housing (30) on a side of the bearing housing (30) opposite the turbine housing (20).
31. The supercharging device (1) according to embodiment 30, comprising a turbine wheel (40), which is arranged in a receiving space (23) of the turbine housing (20), and
    a shaft (70), which is mounted rotatably in the bearing housing (30),
    wherein the compressor (60) has a compressor wheel (62), and
    wherein the turbine wheel (40) and the compressor wheel (62) are coupled to the shaft (70) at opposite ends of the shaft (70) for rotation therewith.
32. An engine system (2), comprising:
    a supercharging device (1) according to embodiment 30 or embodiment 31, and
    an internal combustion engine (3) with a plurality of cylinders (4),
    wherein the turbine unit (10) is arranged downstream of the internal combustion engine (3) and a turbine housing inlet (21) of the turbine housing (20) is fluidically connected to the plurality of cylinders (4), in particular wherein the turbine unit (10) comprises a guide device (50) having a plurality of adjustable guide vanes.

33. The engine system (2) according to embodiment 32, wherein the turbine unit (10) comprises a turbine wheel (40) and the guide device (50), wherein the turbine wheel (40) is arranged in a receiving space (23) of the turbine housing (20), wherein the guide device (50) is arranged radially outside the turbine wheel (40) in the turbine housing (20) and surrounds the turbine wheel (40) circumferentially.

34. The engine system (2) according to embodiment 32 or embodiment 33, wherein the compressor (60) is arranged upstream of the internal combustion engine (3) and a compressor housing outlet (63) of the compressor housing (61) is fluidically connected to the internal combustion engine (3).

The invention claimed is:

1. A turbine unit (10) for a supercharging device (1), comprising:

a bearing housing (30), and a turbine housing (20), which is coupled to the bearing housing (30) via a flange connection (100), the flange connection (100) comprising:

a turbine-housing-side flange (110), and a bearing-housing-side flange (120), the turbine-housing-side flange (110) and the bearing-housing-side flange (120) being designed and coupled to each other in such a way that they form an axial distance region (130) and an axial contact region (140) of the flange connection (100), the turbine-housing-side flange (110) and the bearing-housing-side flange (120) being continuously spaced apart from each other in the axial distance region (130) in the axial direction (22) during operation of the turbine unit (10), the axial contact region (140) being arranged radially on the inside with respect to the axial distance region (130), wherein a radial distance ($R_D$) between an outer radius of the axial contact region ($R_{KA}$) and a circumferential radius ($R_F$) of the bearing-housing-side flange (120) is at least 3.50 mm, and wherein the axial contact region (140) has a first radial width ($R_1$) and wherein the axial distance region (130) has a second radial width ($R_2$), wherein a ratio of the first radial width ($R_1$) to the second radial width ($R_2$) lies in a range of 0.20 to 0.45, wherein the turbine-housing-side flange (110) and the bearing-housing-side flange (120) are designed and coupled to each other in such a way that they form at least one shoulder (160). which provides a radial centering surface pairing, and wherein the shoulder (160) is arranged in the radial direction (22) in the axial distance region (130), wherein the shoulder (160) divides the axial distance region (130) into a first axial distance region (131) and at least one second axial distance region (132), wherein the first axial distance region (131) is arranged in the radial direction (24) between the shoulder (160) and the axial contact region (140), and wherein the second axial distance region (132) is arranged in the radial direction (24) between the shoulder (160) and the circumferential radius ($R_F$) of the bearing-housing-side flange (120).

2. The turbine unit (10) as claimed in claim 1, wherein the turbine-housing-side flange (110) and the bearing-housing-side flange (120) are in axial contact directly with each other in the axial contact region (140).

3. The turbine unit (10) as claimed in claim 1, and wherein the axial distance region (130) extends in the radial direction (24) between the outer radius of the axial contact region ($R_{KA}$) and the circumferential radius ($R_F$) of the bearing-housing-side flange (120).

4. The turbine unit (10) as claimed in claim 1, wherein the axial contact region (140) extends in the radial direction (24) between an inner radius ($R_{KI}$) of the axial contact region (140) and the outer radius ($R_{KA}$).

5. The turbine unit (10) as claimed in claim 4, wherein the inner radius ($R_{KI}$) of the axial contact region (140) corresponds to an inner radius of the turbine housing (10) proximal to the bearing-housing-side flange (110).

6. The turbine unit (10) as claimed in claim 1, wherein the flange connection (100) comprises at least one connecting element (150) which is coupled to the turbine-housing-side flange (110) and the bearing-housing-side flange (120) in such a way that it generates an axial clamping force between the turbine-housing-side flange (110) and the bearing-housing-side flange (120) in the axial contact region (140).

7. The turbine unit (10) as claimed in claim 6, wherein the connecting element (150) is arranged in the radial direction (24) in such a way that it generates an axial force ($F_1$, $F_2$) between the turbine-housing-side flange (110) and the bearing-housing-side flange (120) in the axial distance region (130), wherein the clamping force is generated by the axial force ($F_1$, $F_2$).

8. The turbine unit (10) as claimed in claim 1, wherein the ratio lies in a range of 0.24 to 0.30.

9. The turbine unit (10) as claimed in claim 1, wherein the flange connection (100) has at least one sealing element (170), which is clamped between the turbine-housing-side flange (110) and the bearing-housing-side flange (120) in the axial distance region (130), wherein the at least one sealing element (170, 170_a_) is clamped in the first axial distance region (131), and/or wherein the sealing element (170, 170_b_) is clamped in the second axial distance region (132).

10. The turbine unit (10) as claimed in claim 1, wherein the bearing-housing-side flange (120) is formed integrally with the bearing housing (30) and wherein the turbine-housing-side flange (110) is formed integrally with the turbine housing (20).

11. The turbine unit (10) as claimed in claim 1, wherein the bearing housing (30) has at least one annular cooling channel (31), which is arranged radially on the inside of the bearing-housing-side flange (120) and proximally to a side surface of the bearing housing (30) facing the turbine housing (20).

12. A supercharging device (1) for an internal combustion engine or a fuel cell, comprising:

a turbine unit (10) as claimed in claim 1, and a compressor (60) with a compressor housing (61), the compressor housing (61) being coupled to the bearing housing (30) on a side of the bearing housing (30) opposite the turbine housing (20).

13. An engine system (2), comprising:

a supercharging device (1) as claimed in claim 12, and an internal combustion engine (3), wherein the turbine unit (10) is arranged downstream of the internal combustion engine (3) and a turbine housing inlet (21) of the turbine housing (20) is fluidically connected to the internal combustion engine (3).

14. The engine system (2) as claimed in claim 13, wherein the turbine unit (10) comprises a fluid flow guide device (50) having a plurality of adjustable guide vanes.

15. A turbine unit (10) as claimed in claim 1, further comprising a guide device (50).

16. A turbine unit (10) for a supercharging device (1), comprising:

a bearing housing (30), and a turbine housing (20), which is coupled to the bearing housing (30) via a flange connection (100), the flange connection (100) comprising:

a turbine-housing-side flange (110), and a bearing-housing-side flange (120), the turbine-housing-side flange (110) and the bearing-housing-side flange (120) being designed and coupled to each other in such a way that they form an axial distance region (130) and an axial contact region (140) of the flange connection (100), the turbine-housing-side flange (110) and the bearing-housing-side flange (120) being continuously spaced apart from each other in the axial distance region (130) in the axial direction (22) during operation of the turbine unit (10).

the axial contact region (140) being arranged radially on the inside with respect to the axial distance region (130), wherein a radial distance ($R_D$) between an outer radius of the axial contact region ($R_{KA}$) and a circumferential radius ($R_F$) of the bearing-housing-side flange (120) is at least 3.50 mm, wherein the axial contact region (140) has a first radial width ($R_1$) and wherein the axial distance region (130) has a second radial width ($R_2$), wherein a ratio of the first radial width ($R_1$) to the second radial width ($R_2$) lies in a range of 0.20 to 0.45, and wherein the flange connection (100) has at least one sealing element (170), which is clamped between the turbine-housing-side flange (110) and the bearing-housing-side flange (120) in the axial distance region (130).

17. The turbine unit (10) as claimed in claim 16, wherein the bearing-housing-side flange (120) and/or the turbine-housing-side flange (110) has at least one annular depression (114, 124) in which the sealing element (170) is arranged.

* * * * *